United States Patent
Sun et al.

(10) Patent No.: US 10,213,870 B2
(45) Date of Patent: Feb. 26, 2019

(54) OPTICAL LENSES FOR LASER MARKING

(71) Applicant: HAN'S LASER TECHNOLOGY INDUSTRY GROUP CO., LTD., Shenzhen, Guangdong (CN)

(72) Inventors: Bo Sun, Shenzhen (CN); Jiaying Li, Shenzhen (CN); Chaoming Zhou, Shenzhen (CN); Yuqing Chen, Shenzhen (CN); Yunfeng Gao, Shenzhen (CN)

(73) Assignee: HAN'S LASER TECHNOLOGY INDUSTRY GROUP CO., LTD., Shenzhen (CN)

( * ) Notice: Subject to any disclaimer, the term of this patent is extended or adjusted under 35 U.S.C. 154(b) by 0 days.

(21) Appl. No.: 15/518,048

(22) PCT Filed: Nov. 28, 2014

(86) PCT No.: PCT/CN2014/092429
§ 371 (c)(1),
(2) Date: Apr. 10, 2017

(87) PCT Pub. No.: WO2016/082172
PCT Pub. Date: Jun. 2, 2016

(65) Prior Publication Data
US 2017/0312851 A1    Nov. 2, 2017

(51) Int. Cl.
*B23K 26/06* (2014.01)
*G02B 13/00* (2006.01)
*B23K 26/18* (2006.01)

(52) U.S. Cl.
CPC .......... *B23K 26/0648* (2013.01); *B23K 26/18* (2013.01); *G02B 13/0035* (2013.01)

(58) Field of Classification Search
CPC . G02B 13/0035; B23K 26/0648; B23K 26/18
(Continued)

(56) References Cited

U.S. PATENT DOCUMENTS

2004/0004748 A1* 1/2004 Kawabata ............ G02B 26/124
359/216.1
2007/0115557 A1   5/2007 George et al.
(Continued)

FOREIGN PATENT DOCUMENTS

CN     2585256 Y    11/2003
CN   101369047 A    2/2009
(Continued)

OTHER PUBLICATIONS

International Search Report dated Jun. 17, 2015 from International Application No. PCT/CN2014/092429 with English translation.

*Primary Examiner* — Zachary W Wilkes
*Assistant Examiner* — George G King
(74) *Attorney, Agent, or Firm* — Polsinelli PC

(57) ABSTRACT

An optical lens for laser marking includes a first lens (L1), a second lens (L2), and a third lens (L3), which are successively coaxially arranged along a transmission direction of incident light, wherein the first lens (L1) and the second lens (L2) are meniscus lenses, and the third lens (L3) is a biconvex lens; wherein the first lens (L1) has a first surface (S1) and a second surface (S2), the second lens (L2) has a third surface (S3) and a fourth surface (S4), the third lens (L3) has a fifth surface (S5) and a sixth surface (S6); the first surface (S1) to the sixth surface (S6) are successively arranged along the transmission direction of the incident light; wherein radii of curvature of the first surface to the sixth surface are −47±5% mm, ∞, −218±5% mm, −81±5% mm, 778±5% mm, and −142±5% mm, respectively; wherein central thicknesses of the first lens, the second lens, and the third lens are 4±5% mm, 15±5% mm, and 18±5% mm, respectively. The optical lens for laser marking not only has high engraving quality, but also has a high engraving speed with a higher efficiency than conventional engraving lens.

6 Claims, 4 Drawing Sheets

(58) Field of Classification Search
USPC .......................................... 359/362, 365, 366
See application file for complete search history.

(56) References Cited

U.S. PATENT DOCUMENTS

| | | |
|---|---|---|
| 2011/0096405 A1 | 4/2011 | Li |
| 2011/0102904 A1* | 5/2011 | Li .......................... G02B 13/18 |
| | | 359/662 |

FOREIGN PATENT DOCUMENTS

| | | |
|---|---|---|
| CN | 101881875 A | 11/2010 |
| CN | 203025408 U | 6/2013 |
| CN | 203275743 U | 11/2013 |
| JP | 2009198833 A | 9/2009 |

* cited by examiner

OPTICAL LENSES FOR LASER MARKING

CROSS REFERENCE TO RELATED APPLICATIONS

This application is a National Phase filing under 35 U.S.C. § 371 of PCT/CN2014/092429 filed on Nov. 28, 2014. The entire contents of the application is hereby incorporated by reference.

FIELD OF THE INVENTION

The present disclosure relates to the field of optical lens, and more particularly relates to an optical lens for marking in a laser processing device.

BACKGROUND OF THE INVENTION

With the development of electronic devices such as mobile phones, personal computers and panel TVs, the production demand of panels applied to these products is also gradually increased. During the production process of the panels, it requires to scribe the panel with laser to engrave and cut the panels. In order to ensure that the panels meet technical requirements of these products, a "fine" and "deep" engraving line should be guaranteed during engraving the panels with laser. Therefore, requirements of the engraving lens for the laser marking machine are getting higher and higher.

Conventional laser marking machine use a single engraving lens or a plurality of (usually up to three) engraving lenses. Although using a single engraving lens can improve the quality of the engraving line, the operating table is required to move back and forth to cooperate with the lens for engraving or cutting, such that the engraving speed is very slow. With regard to multiple engraving lenses, the engraving speed can be improved, while the consistent depth and width of the engraving line cannot be guaranteed.

SUMMARY

Therefore, it is necessary to provide an optical lens for laser marking, which has high engraving quality and high engraving speed.

An optical lens for laser marking includes a first lens, a second lens, and a third lens, which are successively coaxially arranged along a transmission direction of incident light, wherein the first lens and the second lens are meniscus lenses, and the third lens is a biconvex lens; wherein the first lens has a first surface and a second surface, the second lens has a third surface and a fourth surface, the third lens has a fifth surface and a sixth surface; the first surface to the sixth surface are successively arranged along the transmission direction of the incident light; wherein radii of curvature of the first surface to the sixth surface are −47±5% mm, ∞, −218±5% mm, −81±5% mm, 778±5% mm, and −142±5% mm, respectively; wherein central thicknesses of the first lens, the second lens, and the third lens are 4±5% mm, 15±5% mm, and 18±5% mm, respectively.

In one embodiment, ratios of refractive index to Abbe number of the first lens, the second lens, and the third lens are (1.50/62)±5%, (1.80/25)±5%, and (1.80/25)±5%, respectively.

In one embodiment, an interval between the first lens and the second lens is 12±5% mm; an interval between the second lens and the third lens is 0.3±5% mm.

In one embodiment, the lens further includes a protective lens arranged on an image side of the third lens.

In one embodiment, the protective lens is a plate glass, the protective lens has a thickness of 2±5% mm; an interval between the protective lens and the third lens is 2±5% mm.

In one embodiment, parameters of the optical lens for laser marking are as follows: f=160 mm; Φ=7 mm; marking range: A=100*100 mm$^2$; operating wavelength: λ=1064 nm.

The foregoing optical lens for laser marking employs the lens with F-θ structure, therefore it not only has high engraving quality to ensure a "fine" and "deep" engraving line, but also has high a engraving speed with a higher efficiency than conventional engraving lens.

BRIEF DESCRIPTION OF THE DRAWINGS

The above objects, features and advantages of the present invention will become more apparent by describing in detail embodiments thereof with reference to the accompanying drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

In order to make the above and other objects, features and advantages of the present invention become more apparent, the specific embodiments will be described in detail in combination with the accompanying drawings. Numerous specific details are described hereinafter in order to facilitate a thorough understanding of the present disclosure. The various embodiments of the disclosure may, however, be embodied in many different forms and should not be construed as limited to the specific embodiments set forth hereinafter, and people skilled in the art can make similar modifications without departing from the spirit of the present disclosure.

Figure 1:
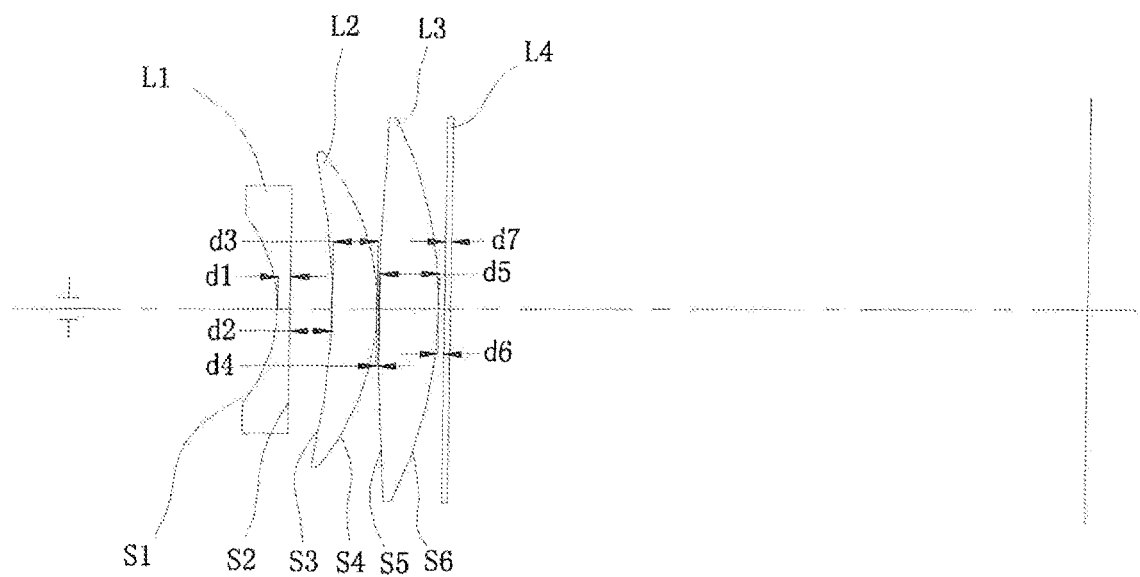
FIG. 1 is a schematic diagram of an optical lens for laser marking according to one embodiment.

FIG. 1 is a schematic diagram of an optical lens for laser marking according to one embodiment, for illustrative purposes, only portions related to implementation of the disclosure are shown.

In an optical system of the illustrated embodiment, the propagation direction of the light is from the left side to the right side of the drawing. The positive or negative curvature radius of the lens is determined by taking a relative positional relationship between an intersection point of the curved surface and the principal optical axis and a center of the spherical surface of the curved surface. If the center of the spherical surface is in the left of the intersection point, the radius of curvature has a negative value, if, on the other hand, the center of the spherical surface is in the right of the intersection point, the radius of curvature has a positive value.

Referring to FIG. 1, the optical lens for laser marking according to one embodiment is a telecentric marking Fθ lens, which includes a first lens L1, a second lens L2, a third lens L3, and a protective lens L4, which are successively coaxially arranged along a transmission direction of incident light.

The first lens L1 is a meniscus lens, which has a first surface S1 and a second surface S2, which are disposed opposite to each other. The first surface S1 is a convex surface facing an image side, a radius of curvature thereof is −47 mm. The second surface S2 is a flat surface, a radius of curvature thereof is ∞, i.e. infinite. The first lens L1 has a central thickness d1 (i.e. a thickness of the first lens L1 along an optical axis) of 4 mm. The first lens L1 has a ratio of refractive index to Abbe number of 1.50/62. It should be understood that, the tolerance for the foregoing parameters is 5%, i.e., those parameters can vary within ±5%.

The second lens L2 is a meniscus lens, which has a third surface S3 and a fourth surface S4, which are disposed opposite to each other. The third surface S3 is a convex surface facing the image side, a radius of curvature thereof is −218 mm. The fourth surface S4 is also a convex surface facing the image side, a radius of curvature thereof is −81 mm. The second lens L2 has a central thickness d3 of 15 mm. The second lens L2 has a ratio of refractive index to Abbe number of 1.80/25. It should be understood that, the tolerance for the foregoing parameters is 5%, i.e., those parameters can vary within ±5%.

The third lens L3 is a biconvex lens, which has a fifth surface S5 and a sixth surface S6, which are disposed opposite to each other. The fifth surface S5 is a convex surface facing an object side, a radius of curvature thereof is 778 mm. The sixth surface S6 is a convex surface facing the image side, a radius of curvature thereof is −142 mm. The third lens L3 has a central thickness d5 of 18 mm. The third lens L3 has a ratio of refractive index to Abbe number of 1.80/25. It should be understood that, the tolerance for the foregoing parameters is 5%, i.e., those parameters can vary within ±5%.

The first surface S1 to the sixth surface S6 are successively arranged along the transmission direction of the incident light.

The protective lens L4 is provided on the image side of the third lens L3. In the illustrated embodiment, the protective lens L4 is a plate glass, i.e. both surfaces thereof are flat having radii of curvature of ∞. The protective lens L4 has a central thickness d7 of 2 mm. The protective lens L4 has a ratio of refractive index to Abbe number of 1.50/62. It should be understood that, the tolerance for the foregoing parameters is 5%, i.e., those parameters can vary within ±5%. It should be understood that the protective lens L4 can also be omitted.

In addition, an interval between the first lens L1 and the second lens L2, an interval between the second lens L2 and the third lens L3, and an interval between the third lens L3 and the protective lens L4 are further defined herein. In the illustrated embodiment, an interval d2 between the outgoing surface (the second surface S2) of the first lens L1 and the incident surface (the third surface S3) of the second lens L2 along the optical axis is 12 mm, with a tolerance of 5%. An interval d4 between the outgoing surface (the fourth surface S4) of the second lens L2 and the incident surface (the fifth surface S5) of the third lens L3 along the optical axis is 0.3 mm, with a tolerance of 5%. An interval d6 between the outgoing surface (the sixth surface S6) of the third lens L3 and the incident surface of the protective lens L4 along the optical axis is 2 mm, with a tolerance of 5%.

The foregoing optical lens for laser marking has a focal length f of 160 mm, an outer diameter Φ of 7 mm, a marking range A of 100*100 mm, and an operating wavelength λ of 1064 nm. When the optical lens for laser marking is used for engraving, a depth of the line can reach 0.5 mm; if a numerical aperture angle sin α=0.02, a width of the line can reach 0.03 mm.

Figure 2:
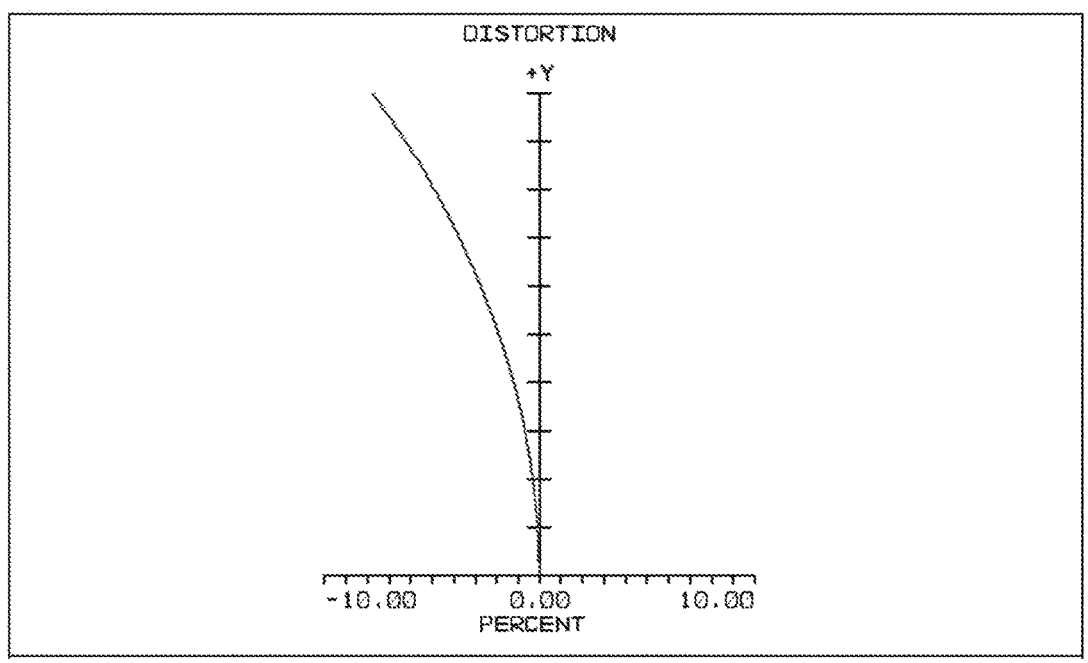
FIG. 2 is a graphic diagram showing a fine beam aberration of the optical lens for laser marking according to one embodiment.
Figure 3:
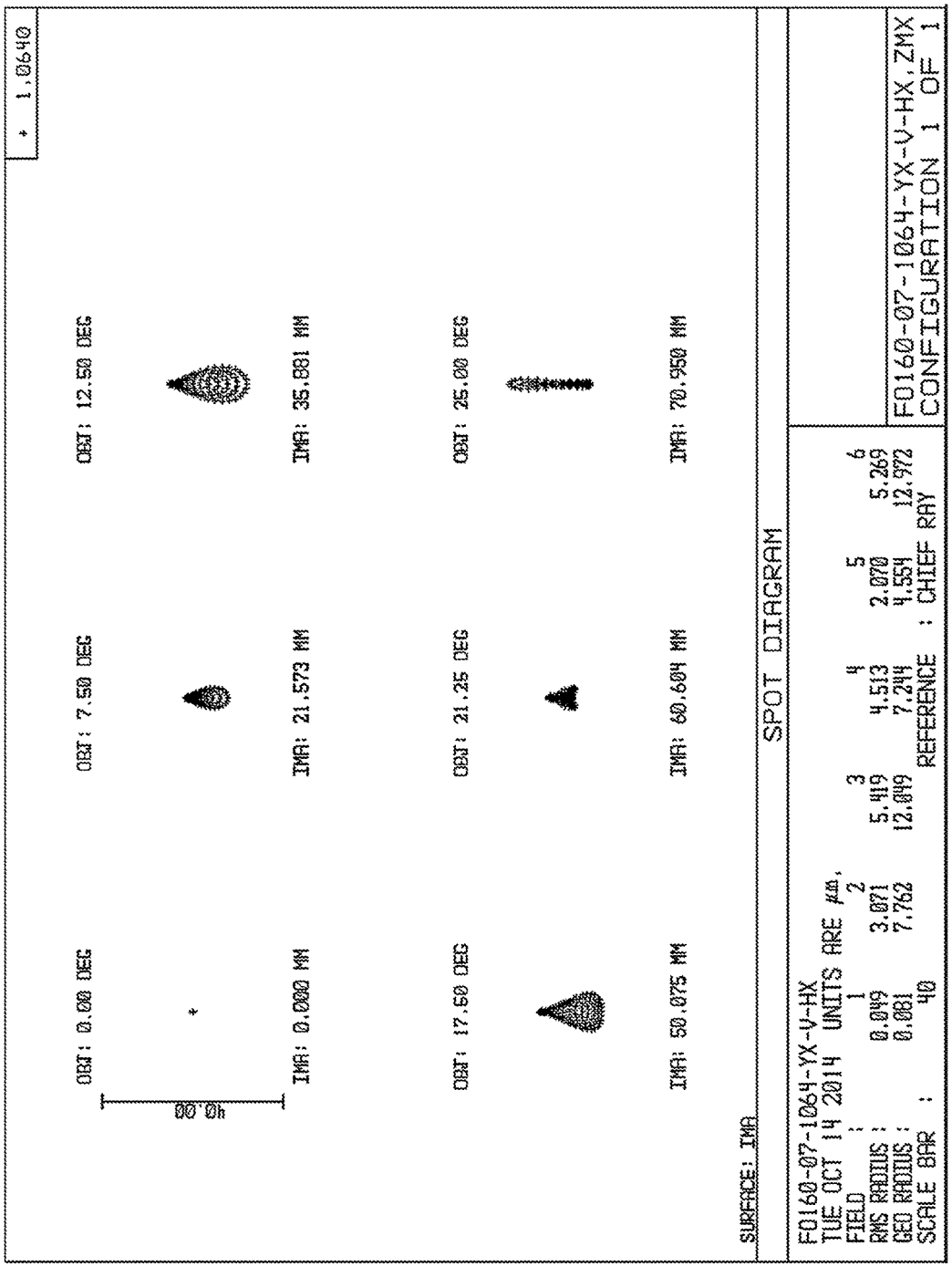
FIG. 3 is a graphic diagram showing a geometric aberration of the optical lens for laser marking according to one embodiment.
Figure 4:
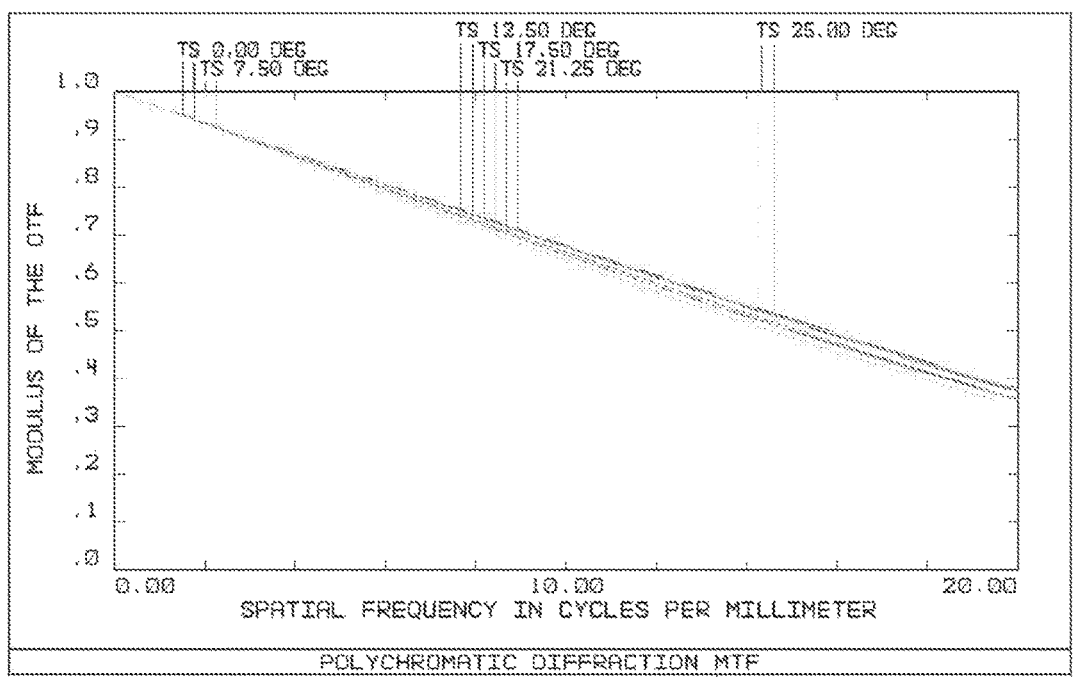
FIG. 4 is a graphic diagram showing a modulation transfer function of the optical lens for laser marking according to one embodiment.

FIGS. 2 to 4 are graphic diagrams showing fine beam aberration, geometric aberration, and modulation transfer function (transfer function M.T.F) of the optical lens for laser marking.

As shown in FIG. 2, field curvature and distortion of the optical lens for laser marking reaches an ideal level.

As shown in FIG. 3, the size of the circle of confusion of the whole image surface is within 6 μm, which reaches an ideal level.

As shown in FIG. 4, when the resolution reaches 20 line/mm, M.T.F of the optical lens for laser marking is still greater than 0.3, which is ideal.

As can be seen from the above data, by employing the lens with F-θ structure, the optical lens for laser marking not only has high engraving quality to ensure a "fine" and "deep" engraving line, but also can ensure the consistency of the depth and width of the engraving line. The optical lens has a high engraving speed with a higher efficiency than conventional engraving lens.

The foregoing embodiments are merely specific implementations of the present invention, but are not intended to limit the protection scope of the present invention. It should be noted that any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. An optical lens for laser marking, comprising:
a first lens, a second lens, and a third lens, which are successively coaxially arranged along a transmission direction of incident light, wherein the first lens is a plano-convex lens and the second lens is a meniscus lens, and the third lens is a biconvex lens;
wherein the first lens has a first surface and a second surface, the second lens has a third surface and a fourth surface, the third lens has a fifth surface and a sixth surface; the first surface to the sixth surface are successively arranged along the transmission direction of the incident light;
wherein radii of curvature of the first surface to the sixth surface are −47±5% mm, ∞, −218±5% mm, −81±5% mm, 778±5% mm, and −142±5% mm, respectively;
wherein central thicknesses of the first lens, the second lens, and the third lens are 4±5% mm, 15±5% mm, and 18±5% mm, respectively.

2. The optical lens for laser marking according to claim 1, wherein ratios of refractive index to Abbe number of the first lens, the second lens, and the third lens are (1.50/62)±5%, (1.80/25)±5%, and (1.80/25)±5%, respectively.

3. The optical lens for laser marking according to claim 1, wherein an interval between the first lens and the second lens is 12±5% mm; an interval between the second lens and the third lens is 0.3±5% mm.

4. The optical lens for laser marking according to claim 1, further comprising a protective lens arranged on an image side of the third lens.

5. The optical lens for laser marking according to claim 4, wherein the protective lens is a plate glass, the protective lens has a thickness of 2±5% mm; an interval between the protective lens and the third lens is 2±5% mm.

6. The optical lens for laser marking according to claim 1, wherein parameters of the optical lens for laser marking are as follows: f=160 mm; Φ=7 mm.

\* \* \* \* \*